United States Patent
Kashima

(10) Patent No.: US 9,188,725 B2
(45) Date of Patent: Nov. 17, 2015

(54) TRANSPARENT DISPLAY

(71) Applicant: BOE TECHNOLOGY GROUP CO., LTD., Beijing (CN)

(72) Inventor: Miki Kashima, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 57 days.

(21) Appl. No.: 14/087,174

(22) Filed: Nov. 22, 2013

(65) Prior Publication Data

US 2014/0152939 A1    Jun. 5, 2014

(30) Foreign Application Priority Data

Nov. 30, 2012   (CN) .......................... 2012 1 0507099

(51) Int. Cl.
*F21V 8/00* (2006.01)
*G02F 1/137* (2006.01)
(Continued)

(52) U.S. Cl.
CPC .......... *G02B 6/0001* (2013.01); *G02F 1/13718* (2013.01); *G02F 1/1313* (2013.01); *G02F 1/13362* (2013.01); *G02F 2201/343* (2013.01); *G02F 2203/01* (2013.01)

(58) Field of Classification Search
CPC .............. G02F 1/1347; G02F 1/13471; G02F 1/13718; G02F 1/133636; G02F 2001/13478; G02F 2201/343; G02F 2201/346; G02F 2203/01; G02F 1/13362; C09K 19/02
USPC ......... 349/115, 172, 176, 74, 97, 61, 76, 175, 349/179, 9, 96, 65
See application file for complete search history.

(56) References Cited

U.S. PATENT DOCUMENTS 6,671,008 B1   12/2003  Li et al.
7,165,856 B2 *  1/2007  Tseng et al. .................... 362/26
(Continued)

FOREIGN PATENT DOCUMENTS

CN   100410762 C   8/2008
JP   2007219258 A   8/2007
(Continued)

OTHER PUBLICATIONS

Korean First Office Action dated Aug. 27, 2014 regarding Korean Application No. 10-2013-0137612. Translation provided by Dragon Intellectual Property Law Firm.
(Continued)

*Primary Examiner* — Thoi Duong
(74) *Attorney, Agent, or Firm* — Harness, Dickey & Pierce, P.L.C.

(57) ABSTRACT

The present invention provides a transparent display which comprises a light source; a first liquid crystal layer, for transmitting a first part of the light emitted from the light source and reflecting a second part of the light emitted from the light source; a light-transmittable image display device including a second liquid crystal layer, wherein the first part of the light is emitted to the second liquid crystal layer, when the image display device is in a first state, the first part of the light is transmitted through the second liquid crystal layer, and the image display device displays an image; when the image display device is in a second state, the first part of the light is reflected by the second liquid crystal layer, and the image display device becomes transparent. The transparent display according to the present invention can realize the function of a transparent display without use of a sheet polarizer or a light guide plate. Therefore, in comparison with the transparent display of the prior art, the transparent display according to the present invention has greatly-improved light transmittance.

7 Claims, 1 Drawing Sheet

(51) Int. Cl.
*G02F 1/13* (2006.01)
*G02F 1/1335* (2006.01)

(56) References Cited

U.S. PATENT DOCUMENTS

| | | | | |
|---|---|---|---|---|
| 7,193,674 | B2* | 3/2007 | Hong | 349/141 |
| 2002/0030776 | A1* | 3/2002 | Khan et al. | 349/114 |
| 2002/0167627 | A1* | 11/2002 | Umeya | 349/96 |
| 2003/0160917 | A1* | 8/2003 | Takahashi et al. | 349/113 |

FOREIGN PATENT DOCUMENTS

| | | |
|---|---|---|
| KR | 1019990036036 | 5/1999 |
| KR | 1020110014904 | 9/2011 |
| WO | WO-9705520 A1 | 2/1997 |
| WO | WO-2012154236 A1 | 11/2012 |

OTHER PUBLICATIONS

Chinese First Office Action dated Sep. 3, 2014 regarding Chinese Application No. 2012105070995. Translation provided by Dragon Intellectual Property Law Firm.
European Search Report dated Apr. 24, 2014 regarding Application No. 1319365306-1904.

* cited by examiner

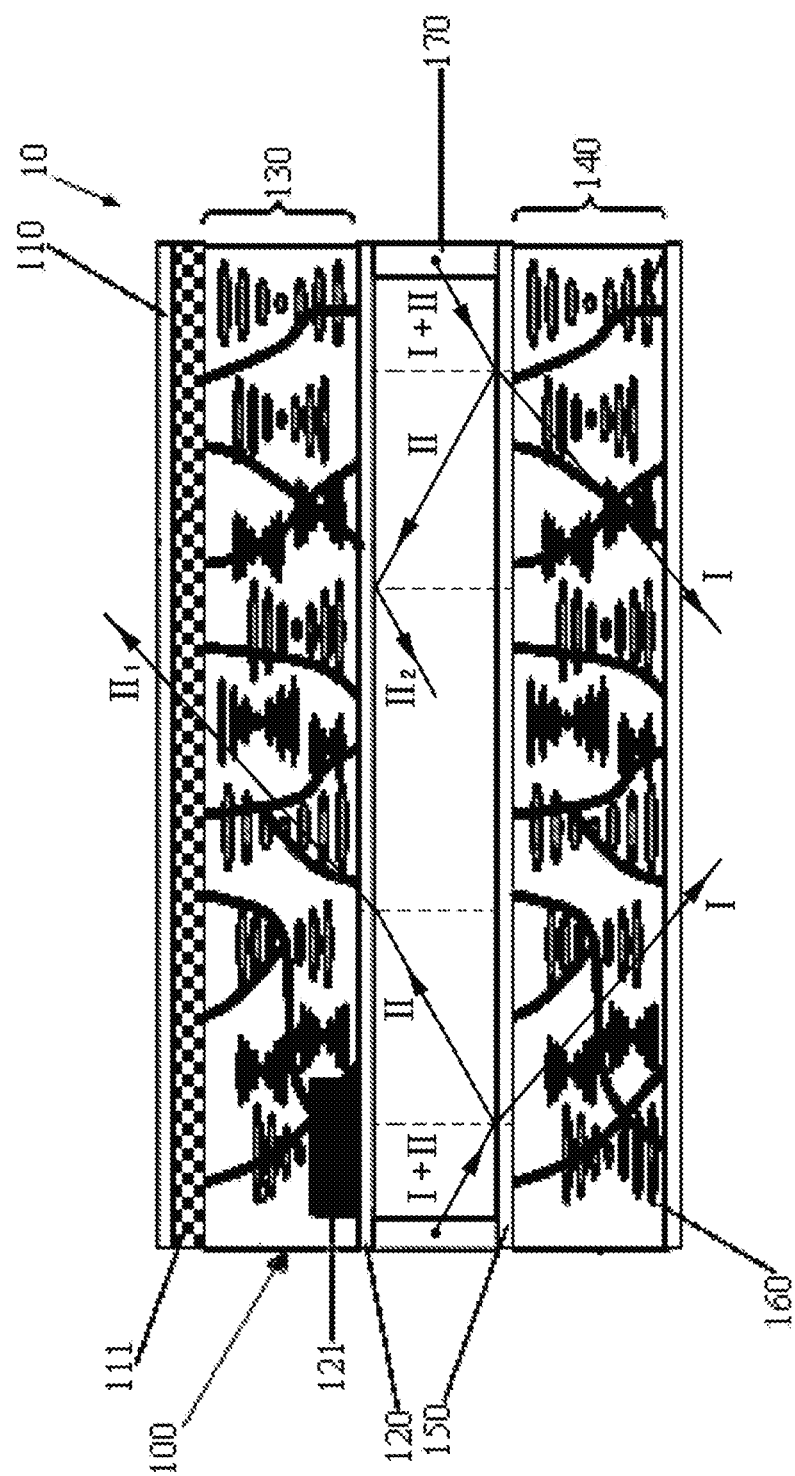

TRANSPARENT DISPLAY

CROSS REFERENCE

The present application claims priority to the Chinese application No. 201210507099.5 filed on Nov. 30, 2012, entitled with "Transparent display", the entire contents of which are incorporated herein by reference.

FIELD OF THE INVENTION

The present invention relates to the technical field of liquid crystal display, and in particular, to a transparent display.

DESCRIPTION OF THE PRIOR ART

Recently, with the development of information technology, transparent display technology gains more and more attention. A transparent display has a certain degree of penetrability, wherein when a voltage is applied, information may be displayed on the display screen, and when no voltage is applied, the background image behind the displayed image may be seen through the display screen, thus it is suitable for the windows of a building and a vehicle, as well as the shop windows. In addition to the inherent display function, it further has the features of a future display which provides information, thus it gains the attention of the market. And in the further, it is likely to replace a part of the market that uses a display, including buildings, advertisings and public utilities.

In the basic construction of an existing transparent display, a back light source is installed on a side edge of a transparent light guide plate, then the transparent light guide plate is combined with a liquid crystal panel; a light transmitted to the liquid crystal layer is rotated and delayed via an upper sheet polarizer and a lower sheet polarizer; and by controlling the light rotation direction of the upper sheet polarizer and the lower sheet polarizer, the state of a light is made different after it transmits through vertically-arranged liquid crystal molecules or rotatory liquid crystal molecules, and the display panel can realize a normal black mode or a normal white mode, for displaying an image information or being transparent. However, for a transparent display device with such structure in the prior art, due to the employing of a sheet polarizer and a light guide plate, the light transmittance cannot meet the requirement sometimes, that is, the transparent display state of the display screen is not good.

SUMMARY OF THE INVENTION

The object of the technical solutions of the invention is to provide a transparent display, which can solve the problem of low light transmittance of an existing transparent display due to the employing of a sheet polarizer and a light guide plate.

One aspect of the invention provides a transparent display, wherein the transparent display includes:

a light source;

a first liquid crystal layer, for transmitting a first part of the light emitted from the light source and reflecting a second part of the light emitted from the light source;

a light-transmittable image display device including a second liquid crystal layer, wherein the first part of the light is emitted to the second liquid crystal layer, when the image display device is in a first state, the first part of the light is transmitted through the second liquid crystal layer, and the image display device displays an image; when the image display device is in a second state, the first part of the light is reflected by the second liquid crystal layer, and the image display device becomes transparent.

Preferably, in the above transparent display, the light source is set between the first liquid crystal layer and the image display device, and one such light source is individually set on both side edges of the region between the first liquid crystal layer and the image display device.

Preferably, in the above transparent display, a cholesteric-phase liquid crystal with a first screw pitch is formed on the first liquid crystal layer and the second liquid crystal layer, respectively.

Preferably, in the above transparent display, the first liquid crystal layer and the second liquid crystal layer individually include a cholesteric-phase liquid crystal with a left-hand screw pitch structure, the first part of the light is a right-handed light, and the second part of the light is a left-handed light.

Preferably, in the above transparent display, the image display device further comprises:

a first substrate with a first light transmittance including a color film layer; and a second substrate with a second light transmittance including a thin-film transistor layer, wherein the second substrate and the first substrate is set opposite to each other;

wherein, the second liquid crystal layer is set between the first substrate and the second substrate.

Preferably, in the above transparent display, when a voltage is applied to the second liquid crystal layer, the image display device will be in the first state; when no voltage is applied to the second liquid crystal layer, the image display device will be in the second state.

Preferably, in the above transparent display, the first liquid crystal layer is set via a third substrate with a third light transmittance and a fourth substrate with a fourth light transmittance, and the third substrate is opposite to the fourth substrate.

Preferably, in the above transparent display, the first liquid crystal layer and the second liquid crystal layer individually include a cholesteric-phase liquid crystal with a right-hand screw pitch structure, the first part of the light is a left-handed light, and the second part of the light is a right-handed light.

At least one of the above technical solutions of the specific embodiments of the invention has the following beneficial effects:

The transparent display according to one specific embodiment of the invention can realize the function of a transparent display without using a sheet polarizer or a light guide plate, and thus in comparison with the transparent display of the prior art, the transparent display according to the invention has a greatly-improved light transmittance.

BRIEF DESCRIPTION OF THE DRAWINGS

FIG. 1 shows a structural representation of the transparent display according to an embodiment of the invention.

DETAILED DESCRIPTION OF THE PREFERRED EMBODIMENTS

To make the objects, the technical solutions and the advantages of the invention more apparent, the invention will be described in detail below in conjunction with the drawings and specific embodiments.

The transparent display according to one specific embodiment of the invention includes:

a light source;

a first liquid crystal layer, for transmitting a first part of the light emitted from the light source and reflecting a second part of the light emitted from the light source; and a light-transmittable image display device, which includes a second liquid crystal layer, wherein the first part of the light is emitted to the second liquid crystal layer, when the image display device is in a first state, the first part of the light is transmitted through the second liquid crystal layer, and the image display device displays an image; when the image display device is in a second state, the first part of the light is reflected by the second liquid crystal layer, and the image display device becomes transparent.

Preferably, a cholesteric-phase liquid crystal can be formed on the first liquid crystal layer and the second liquid crystal layer respectively. By utilizing the features of the cholesteric-phase liquid crystal (light transmission and light scattering are mainly determined by the screw pitch, and only a light beam with a screw direction different from that of the cholesteric-phase liquid crystal can pass through a macromolecular liquid crystal (of which the reflectivity and the transmissivity are both approximately 50%), for example, for a cholesteric-phase liquid crystal with a right-hand screw pitch structure that has a screw pitch approximate to the wavelength of an incident light, when a left-handed light enters, light transmission occurs; when a right-handed light enters, a light scattering the same as Bragg (Fiber Bragg Grating) reflection occurs), after the first liquid crystal layer receives an incident light emitted from the light source, a first part of the light is transmitted, a second part of the light is reflected, and after the second liquid crystal layer receives the first part of the light, the light can be made to be transmitted, and the image display device displays an image, or the light can made to be reflected, and the image display device becomes transparent, thereby the function of a transparent display can be realized.

For the transparent display according to an embodiment of the invention, neither a sheet polarizer nor a light guide plate needs to be used in the realization theory thereof. Therefore, in comparison with the prior art, the light transmittance can be improved greatly.

The structure of the transparent display according to an embodiment of the invention will be described in detail below.

FIG. 1 is a structural representation of a transparent display according to an embodiment of the invention. As shown in FIG. 1, the transparent display 10 includes an image display device 100, wherein the image display device 100 includes:

a first substrate 110 with a first light transmittance, which can make the first substrate 110 to meet a light transmission requirement, wherein a color film layer 111 is formed on the first substrate 110;

a second substrate 120 with a second light transmittance, which can make the second substrate 120 to meet a light transmission requirement, wherein a thin-film transistor (TFT) layer 121 is formed on the second substrate 120, and the first substrate 110 is set opposite to the second substrate 120; similarly, in order to meet the light transmission requirement, both of the color film layer 111 and the TFT layer 121 has a transparent electrode; and a second liquid crystal layer 130, which is set between the first substrate 110 and the second substrate 120.

The first substrate 110, the second substrate 120 and the second liquid crystal layer 130 construct an ordinary image display device, wherein, when a light beam passes through the second liquid crystal layer 130, by applying a voltage control, the liquid crystal molecules on the second liquid crystal layer 130 are arranged along the direction of an electric field, and an image is generated.

As shown in FIG. 1, the transparent display 10 further includes:

a third substrate 150 with a third light transmittance and a fourth substrate 160 with a fourth light transmittance, wherein the third substrate 150 and the fourth substrate 160 are opposite to and parallel with each other; similarly, the third light transmittance makes the third substrate 150 to meet a light transmission requirement, and the fourth light transmittance makes the fourth substrate 160 to meet a light transmission requirement;

a first liquid crystal layer 140, which is set between the third substrate 150 and the fourth substrate 160, and liquid crystal molecules are enveloped by the third substrate 150 and the fourth substrate 160 to form the first liquid crystal layer 140; and a light source 170, which is set between the image display device 100 and the first liquid crystal layer 140, and one such light source 170 is individually set on both side edges the region between the image display device 100 and the first liquid crystal layer 140.

In the embodiment of the invention, a left-hand cholesteric-phase liquid crystal with a first screw pitch is formed on the first liquid crystal layer 140 and the second liquid crystal layer 130 respectively.

By utilizing the features of the left-hand cholesteric-phase liquid crystal, when a light emitted from the light source 170 is transmitted to the first liquid crystal layer 140, only a light beam with a screw direction different from that of the cholesteric-phase liquid crystal can pass through the macromolecular liquid crystal, thus when a left-handed light from the light source 170 irradiates on the first liquid crystal layer 140, a reflection occurs; and when a right-handed light from the light source 170 irradiates on the first liquid crystal layer 140, a transmission occurs.

Based on the structure shown in FIG. 1, the left-handed light reflected by the first liquid crystal layer 140 can be transmitted to the second liquid crystal layer 130, wherein, when no voltage is applied to the second liquid crystal layer 130, the second liquid crystal layer 130 reflects the left-handed light but transmits the right-handed light, that is, the left-handed light reflected by the first liquid crystal layer 140 is reflected by the second liquid crystal layer 130, the second liquid crystal layer 130 is in a dark state, and the image display device 100 becomes transparent; when a voltage is applied to the second liquid crystal layer 130, the second liquid crystal layer 130 transmits both the left-handed light and the right-handed light, that is, the left-handed light reflected by the first liquid crystal layer 140 can be transmitted through the second liquid crystal layer 130, the second liquid crystal layer 130 is in a bright state, and the image display device 100 displays an image.

Table 1 shows the relationship between the states of the image display device 100 when a voltage is applied or not and its display states.

TABLE 1

| | A voltage is applied | | No voltage is applied | |
|---|---|---|---|---|
| Light Source | Left-handed light | Right-handed light | Left-handed light | Right-handed light |
| First liquid crystal layer | Reflected | Transmitted | Reflected | Transmitted |
| Second liquid crystal layer | Transmitted | — | Reflected | — |
| Display State | Bright State (An image is displayed) | | Dark State (No image is displayed, being transparent) | |

It may be understood by a person skilled in the art that, the first liquid crystal layer 140 and the second liquid crystal layer 130 are not limited to a cholesteric-phase liquid crystal with a left-hand screw pitch; instead, they may be a cholesteric-phase liquid crystal with a right-hand screw pitch. The operation theory thereof will be the same as the above cholesteric-phase liquid crystal with a left-hand screw pitch, so it will not be described again here.

The transparent display with the structure shown in FIG. 1 according to an embodiment of the invention may be manufactured by the following steps:

Step 1: A transparent first substrate 110 is prepared, and a color film layer 111 is formed on the first substrate 110;

Step 2: A transparent second substrate 120 is prepared, and a TFT layer 121 is formed on the second substrate 120;

Step 3: A nematic-phase liquid crystal in the form of a chiral ionic liquid, a polymerisable monomer and an initiator are added to the region between the first substrate 110 and the second substrate 120, an ultraviolet light irradiation is carried out at a temperature 10 degrees above the cholesteric-phase and smectic A phase transition temperature of the liquid crystal, and a second liquid crystal layer 130 with a left-hand screw pitch is obtained;

Step 4: A third substrate 150 and a fourth substrate 160 that are both transparent are set opposite to each other, and a Polyimide (PI) liquid is coated on the third substrate 150 and the fourth substrate 160; after the PI is solidified, the surface of the PI film is polished, so that it forms a parallel alignment on the substrate;

Step 5: A polymerisable liquid crystalline monomer and a photoinitiator are added to the region between the third substrate 150 and the fourth substrate 160, and ultraviolet light irradiation is carried out at a temperature 10 degrees above the cholesteric-phase and smectic A phase transition temperature, so that a first liquid crystal layer 140 with a left-hand screw pitch is obtained; and Step 6: A light source 170 is set between the third substrate 150 and the second substrate 120.

For the transparent display according to an embodiment of the invention, the function of a transparent display can be realized without the use of a sheet polarizer or a light guide plate. Therefore, in comparison with the transparent display of the prior art, the light transmittance can be improved greatly.

The above only describes some preferred embodiments of the invention. It should be pointed out that, for a person skilled in the art, various variations and modifications may also be made without departing from the principles of the invention, and all these variations and modifications should be considered to fall within the protection scope of the invention.

What is claimed is:

1. A transparent display, comprising:
   a light source;
   a first liquid crystal layer, for transmitting a first part of the light emitted from the light source and reflecting a second part of the light emitted from the light source; and
   a light-transmittable image display device including a second liquid crystal layer, wherein the second part of the light is emitted to the second liquid crystal layer; wherein when the image display device is in a first state, the second part of the light is transmitted through the second liquid crystal layer, and the image display device displays an image; wherein when the image display device is in a second state, the second part of the light is reflected by the second liquid crystal layer, and the image display device becomes transparent; and
   wherein the light source is set between the first liquid crystal layer and the image display device, and one such light source is individually set on both side edges of a region between the first liquid crystal layer and the image display device.

2. The transparent display according to claim 1, wherein a cholesteric-phase liquid crystal with a first screw pitch is formed on the first liquid crystal layer and the second liquid crystal layer, respectively.

3. The transparent display according to claim 2, wherein the first liquid crystal layer and the second liquid crystal layer individually include a cholesteric-phase liquid crystal with a left-hand screw pitch structure, the first part of the light is a right-handed light, and the second part of the light is a left-handed light.

4. The transparent display according to claim 2, wherein the first liquid crystal layer and the second liquid crystal layer individually include a cholesteric-phase liquid crystal with a right-hand screw pitch structure, the first part of the light is a left-handed light, and the second part of the light is a right-handed light.

5. The transparent display according to claim 1, wherein the image display device further comprises:
   a first substrate with a first light transmittance including a color film layer; and
   a second substrate with a second light transmittance including a thin-film transistor layer, wherein both the second substrate and the first substrate are set opposite to each other;
   wherein the second liquid crystal layer is set between the first substrate and the second substrate.

6. The transparent display according to claim 1, wherein when a voltage is applied to the second liquid crystal layer, the image display device will be in the first state; when no voltage is applied to the second liquid crystal layer, the image display device will be in the second state.

7. The transparent display according to claim 1, wherein the first liquid crystal layer is set via a third substrate with a third light transmittance and a fourth substrate with a fourth light transmittance, and both the third substrate and the fourth substrate are opposite to each other.

* * * * *